US009308660B2

(12) United States Patent
Macsay et al.

(10) Patent No.: US 9,308,660 B2

(45) Date of Patent: Apr. 12, 2016

(54) PLASTIC PIPE CUTTER

(75) Inventors: Steven M. Macsay, Strongsville, OH (US); Glen R. Chartier, Avon Lake, OH (US)

(73) Assignee: Emerson Electric Co., St. Louis, MO (US)

(*) Notice: Subject to any disclaimer, the term of this patent is extended or adjusted under 35 U.S.C. 154(b) by 1874 days.

(21) Appl. No.: 12/573,928

(22) Filed: Oct. 6, 2009

(65) Prior Publication Data

US 2011/0078905 A1 Apr. 7, 2011

(51) Int. Cl.

| | |
|---|---|
| ***B23D 21/06*** | (2006.01) |
| ***B26D 3/16*** | (2006.01) |
| ***B26D 1/04*** | (2006.01) |
| ***B26D 1/09*** | (2006.01) |
| ***B26D 5/10*** | (2006.01) |
| ***B26D 5/16*** | (2006.01) |
| ***B26D 7/01*** | (2006.01) |
| ***B26D 7/08*** | (2006.01) |

(52) U.S. Cl.

CPC .. *B26D 3/16* (2013.01); *B26D 1/04* (2013.01); *B26D 1/09* (2013.01); *B26D 3/169* (2013.01); *B26D 5/10* (2013.01); *B26D 5/16* (2013.01); *B26D 7/01* (2013.01); *B26D 7/088* (2013.01); *B26D 2007/013* (2013.01)

(58) Field of Classification Search

CPC ...... B26D 2007/013; B26D 1/04; B26D 3/16; B26D 1/09; B26D 3/169; B26D 5/10; B26D 5/16; B26D 7/01; B26D 7/088

USPC ............ 30/95, 96, 94, 92, 102, 98–101, 278, 30/279.2

See application file for complete search history.

(56) References Cited

U.S. PATENT DOCUMENTS

| | | | | |
|---|---|---|---|---|
| 823,796 | A | 6/1906 | Leyes | |
| 2,210,769 | A * | 8/1940 | Muker | 30/279.2 |
| 2,250,159 | A * | 7/1941 | Grube | 30/94 |
| 2,704,000 | A * | 3/1955 | Miller | 30/91.2 |
| 2,869,413 | A | 1/1959 | Anderson | |
| 3,636,629 | A | 1/1972 | Baun | |
| 4,146,959 | A | 4/1979 | Hopper | |

(Continued)

FOREIGN PATENT DOCUMENTS

| | | |
|---|---|---|
| CA | 1094940 | 2/1981 |
| CA | 1094940 A1 | 2/1981 |

(Continued)

OTHER PUBLICATIONS

Communication Relating to the Results of the Partial International Search in corresponding international application PCT/US2010/051400, (2 pages).

(Continued)

*Primary Examiner* — Omar Flores Sanchez

(74) *Attorney, Agent, or Firm* — Mark E. Bandy; Rankin, Hill & Clark LLP

(57) ABSTRACT

A hand-held cutting tool is described which is used to readily cut or sever flexible pipe or tubing. The tool features one or more openings in the body of the tool sized to accommodate pipe or tubing to be cut. The tool is used to cut tubing by inserting the tubing into one of the apertures. A retractable blade is urged against the tubing and the tool then orbited about the tubing and/or the tubing rotated until the blade severs the tubing.

20 Claims, 12 Drawing Sheets

(56) References Cited

U.S. PATENT DOCUMENTS

| | | | | |
|---|---|---|---|---|
| 4,333,234 | A | 6/1982 | Smith et al. | |
| 4,734,982 | A | 4/1988 | Khoja | |
| 4,739,554 | A | 4/1988 | Hytonen | |
| 5,414,932 | A * | 5/1995 | Azkona | 30/96 |
| 5,829,142 | A * | 11/1998 | Rieser | 30/93 |
| D405,336 | S | 2/1999 | Hepworth | |
| 5,937,523 | A | 8/1999 | Van Keppel et al. | |
| 5,964,388 | A * | 10/1999 | Jennings et al. | 30/2 |
| 6,378,218 | B2 * | 4/2002 | Sigwart et al. | 30/363 |
| 6,430,815 | B1 * | 8/2002 | Wickline | 30/101 |
| 7,204,021 | B2 * | 4/2007 | Houseman et al. | 30/92 |
| D569,548 | S | 5/2008 | Smith | |
| D626,812 | S * | 11/2010 | Macsay et al. | D8/60 |
| D660,116 | S * | 5/2012 | Owen et al. | D8/60 |
| 2007/0175048 | A1 | 8/2007 | Holley et al. | |
| 2011/0010946 | A1 * | 1/2011 | Wilson | 30/95 |

FOREIGN PATENT DOCUMENTS

| | | |
|---|---|---|
| CN | 200960676 | 10/2007 |
| CN | 201201266 | 3/2009 |
| CN | 201239961 | 5/2009 |
| DE | 2159744 | 6/1973 |
| DE | 4406006 | 6/1995 |
| WO | 2007/004925 | 1/2007 |
| WO | 2007004925 | 1/2007 |

OTHER PUBLICATIONS

Chinese Office Action and Search Report, Application No. 201080055251.X, Jan. 23, 2014 (11 Pages).

* cited by examiner

PLASTIC PIPE CUTTER

FIELD OF INVENTION

The present invention relates to a hand-held cutting tool designed for severing flexible or thin wall pipes or tubing.

BACKGROUND OF THE INVENTION

A wide variety of hand-held cutting tools are known in the art. Many of these tools feature an opening in the body of the tool for receiving a pipe or tube to be cut. Upon receipt of the pipe within the opening, a blade is urged against the pipe for subsequent cutting.

For example, U.S. Pat. No. 823,796 to Leyes is directed to a pipe cutter having a pipe-encircling cylindrical sleeve. A spring loaded blade is radially urged against the outer surface of a pipe to be cut. The ’796 patent uses a blade arrangement in which the blade is held outside of the housing and contacted with a region of pipe external to the housing.

U.S. Pat. No. 4,734,982 to Khoja is directed to a plastic pipe cutter. The tool is used by inserting a pipe into a hole in the body of the cutter and tightening a nut to urge a blade against the outer surface of the pipe. The blade is retained within a slot in the housing of the tool.

U.S. Pat. No. 4,146,959 to Hopper describes a device for cutting a cylindrical article. In like fashion with the previously discussed ’796 patent, the blade cuts within a plane that is external to a tubular support.

Although satisfactory in many respects, these tools have limited application since they can only be used for cutting a single size or relatively small range of sizes of pipes or tubes. Furthermore, these tools provide only limited support of the pipe or tube during cutting as a result of the blade pressing against, and thus detrimentally deforming, the pipe wall during cutting. In addition, for tools having support stabilization guides spaced about the pipe to prevent such deformation, such guides typically obstruct viewing of the cutting interface. Moreover, previously known cutting tools of this type are typically only equipped with knife-style cutting blades, thereby limiting their application and use.

Therefore, a need remains in the art for a cutting tool having one or more, and preferably two or more, openings in the body of the tool in order to accommodate different sizes of pipes or tubing. Moreover, a need exists for such a tool with provisions that promote stabilization of the pipe during cutting yet which do not interfere with viewing and general access to the cutting interface. In addition, a need remains in the art for such a cutting tool, in which the tool features one or more blades or implements that can perform other functions in addition to just cutting.

SUMMARY OF THE INVENTION

The difficulties and drawbacks associated with previously known cutting tools are overcome in the present apparatus for a hand-held cutting tool.

In a first aspect, the present invention provides a cutting tool comprising a housing defining (i) an interior region sized and shaped for receiving at least one implement, (ii) a first aperture extending through the housing, the first aperture defined by a first span, and (iii) a second aperture extending through the housing, the second aperture defined by a second span which is different than the first span. The cutting tool also comprises at least one implement assembly disposed in the housing, the implement assembly including (i) a working implement, (ii) provisions for retracting the working implement into the interior region defined by the housing, and (iii) provisions for extending the working implement into at least one of the first aperture and the second aperture.

In another aspect, the present invention provides a cutting tool comprising a tool housing defining an interior hollow region, the tool housing also defining at least two apertures extending through the tool housing. The cutting tool also comprises a movable implement defining a cutting edge, the implement positionable between (i) a first position in which the implement is disposed entirely within the interior hollow region defined by the tool housing, and (ii) a second position in which at least a portion of the cutting edge is exposed within at least one of the apertures.

And, in yet another aspect, the present invention provides a cutting tool comprising a body defining a first side and a second side oppositely directed from the first side, the body also defining a first aperture extending through the body between the first side and the second side and a second aperture extending through the body between the first side and the second side. The first aperture is larger than the second aperture. And, the cutting tool comprises a first implement selectively positionable between an extended position in which at least a portion of the implement is exposed within the first aperture and a retracted position; and a second implement selectively positionable between an extended position in which at least a portion of the implement is exposed within the second aperture and a retracted position.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
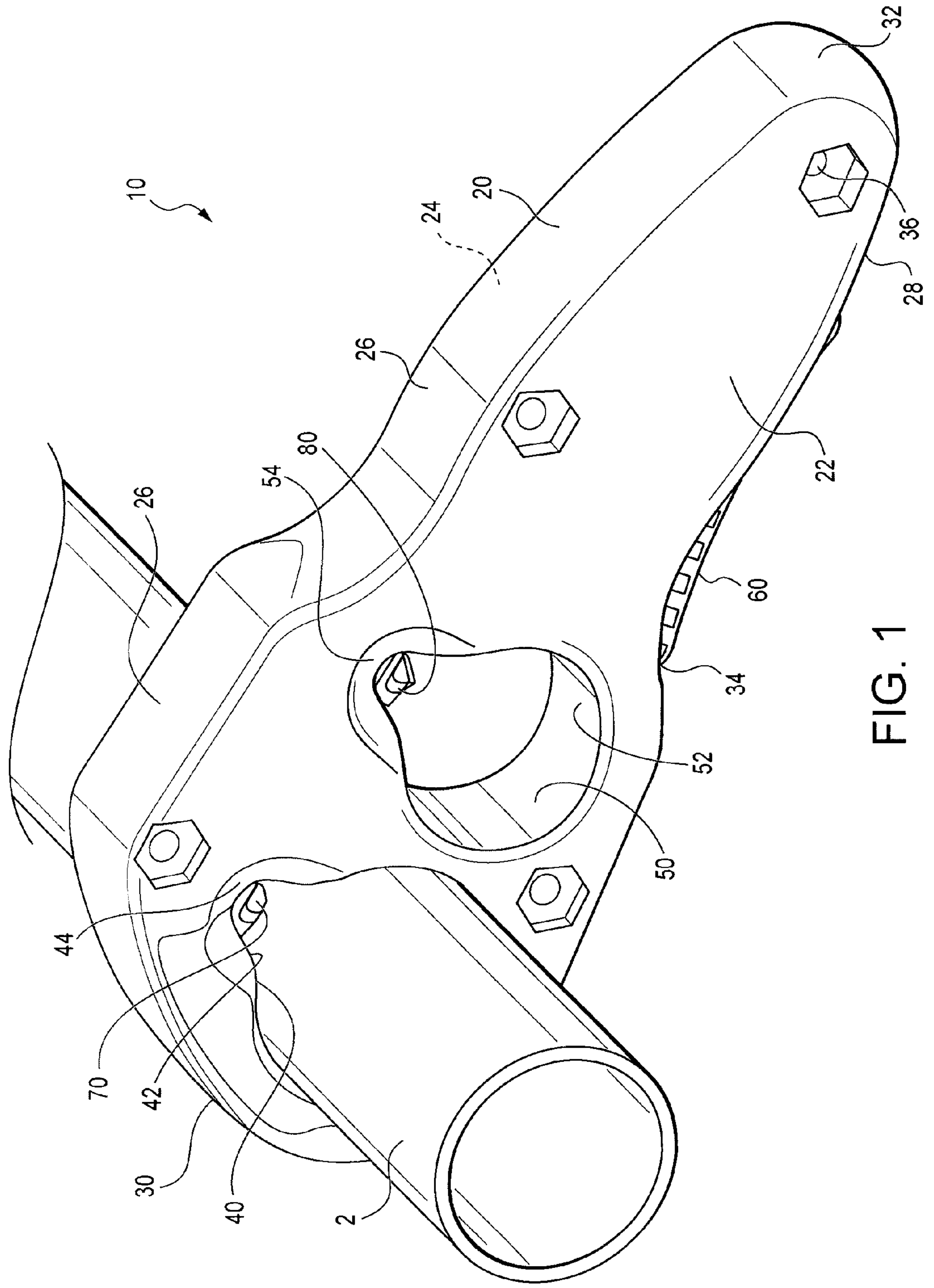
FIG. 1 is a perspective view of a preferred embodiment cutting tool in accordance with the present invention.

The present invention tool is a hand held device that can be used for cutting pipe or tubing. The pipe or tubing to which the cutting device is directed, is relatively flexible and typically characterized as having a thin wall. However, it will be understood that the present invention tool is not limited to thin walled pipes or tubing. Generally, the pipe or tubing is formed from thin walled metal or plastic. Examples of such metal include copper or brass. Chrome plated brass is typically used for exposed ornamental drains. Examples of such plastic tubing include, but are not limited to interior supply and drain lines for bathroom sinks and utility wash basins. Although the device is contemplated to primarily be used for cutting operations, the device can also be used to shape, finish, smooth or otherwise alter an end face of a pipe or tube. The present invention device is compact, lightweight, can be used for cutting and/or preparing pipes of different sizes. The invention also provides various cutting blades or working implement configurations.

Specifically, the present invention tool includes a tool body that has one or more openings through the body and one or more retractable spring loaded blades that extend into each of the respective openings. A pipe or other cylindrical member is cut by inserting an end of the pipe through an opening. Loaded contact between the blade and outer surface of the pipe occurs. The tool is then orbited around the longitudinal axis of the pipe and/or the pipe is rotated about its axis relative to the tool, to cut the pipe. Cutting is generally performed within a plane that is perpendicular to the longitudinal axis of the pipe or tubing at the cut location.

A significant feature of the present invention tool is the provision of at least one opening through which the pipe to be cut is inserted. The opening serves to constrain and stabilize the pipe or tube, particularly during a cutting operation. Without such constraining, it is common for a flexible or thin walled pipe or tubing to undergo significant deformation. Deformation of the pipe or tube from its original circular or near circular configuration can detrimentally alter the resulting cut face of the pipe which in turn may require additional time and effort to obtain a smooth and desirable face. As explained in greater detail herein, in certain preferred versions of the tool, a particular slightly non-circular configuration is used for the opening(s) which has surprisingly been discovered to improve stabilization of the tubing and provide a desirable cut face.

In other versions of the tool, multiple openings of different sizes or spans may be provided. This feature greatly increases the applicability and use of the tool. Thus, instead of carrying multiple tools in order to cut both small and large diameter pipe or tubing, only a single tool is needed.

The one or more, and preferably two or more, apertures or openings in the tool body are fully enclosed. That is, most preferably, the various openings can only be accessed axially or substantially so during operation and/or use of the tool. A fully enclosed opening or aperture as described herein is distinguishable from notches, slots, or other like configurations that are radially accessible such as from a side of the tool.

It is also significant that the blade or implement can be selectively retracted into the body of the tool. This operation promotes a wiping action along the blade and removes dirt or other debris that may be accumulated along the blade or implement. Also, a variety of blade types and/or working implements can be used in conjunction with the present invention tool such as (i) a blade that includes a chamfering edge to de-burr the pipe, (ii) a displacement cutting wheel, and/or (iii) a lathe-style cutting blade. If multiple holes are provided in the tool, then a combination of different blade types can be used. This feature further improves applicability and use of the tool.

Tools

Figure 2:
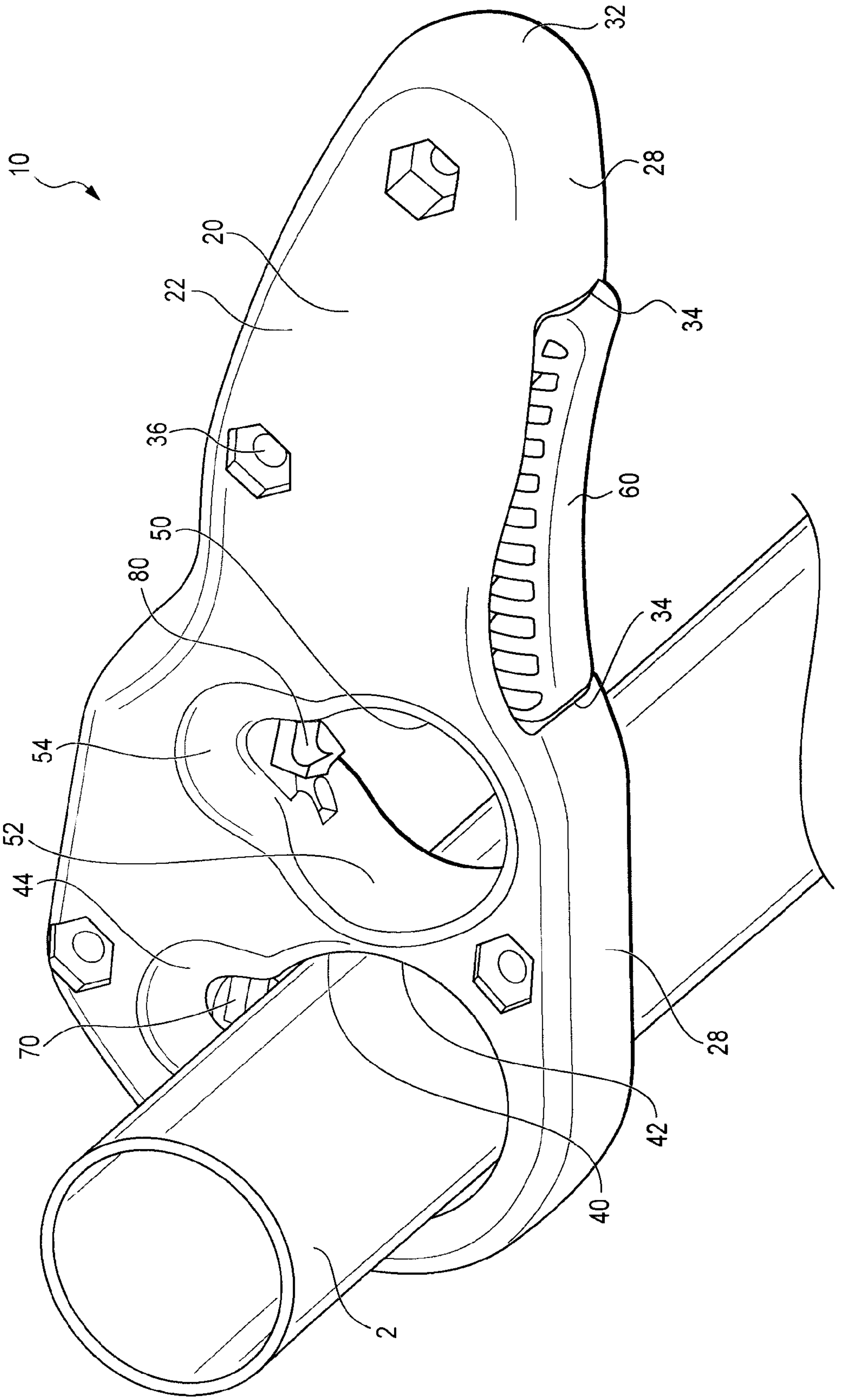
FIG. 2 is another perspective view of the preferred embodiment cutting tool illustrated in FIG. 1.

FIGS. 1 and 2 illustrate a preferred embodiment cutting tool 10 in accordance with the present invention. The tool 10 comprises a housing 20 defining a first side 22, a second oppositely directed side 24, a top edge 26 generally extending between the first side 22 and the second side 24, and a bottom edge 28 generally oppositely directed from the top edge 26 and extending between the first side 22 and the second side 24. The housing 20 also defines a front face 30 extending between the first side 22 and the second side 24 and also between the top edge 26 and the bottom edge 28. The housing 20 further defines a rear face 32 oppositely directed from the front face 30, and extending between the first side 22 and the second side 24, and also between the top edge 26 and the bottom edge 28. Preferably, the various sides, edges, and faces appropriately merge and/or transition into one another to form an aesthetically pleasing and attractive housing or enclosure for the tool 10. Rounded and/or smoothed edges and corners are preferred for certain versions of the tool.

The tool 10, and particularly the housing 20, defines a plurality of openings or apertures that extend through the tool, such as between the first side 22 and the second side 24. For example, the tool 10 depicted in FIGS. 1 and 2 defines a first aperture 40 and a second aperture 50. The apertures receive and support a pipe or tube 2. The first aperture 40 is defined by an interior circumferential wall 42. The interior wall 42 and adjacent regions of the sides 22 and 24 define a blade access region 44. Similarly, the second aperture 50 is defined by an interior circumferential wall 52. The interior wall 52 and adjacent regions of the sides 22 and 24 define a blade access region 54. As described in greater detail herein, the blade access regions, e.g. 44 and 54, are preferably in the form of laterally and inwardly recessed regions proximate the blade or implement. Preferably, a recessed blade access region 44 is defined on the first side 22 and a corresponding recessed blade access region 44 is defined on the second side 24. Similarly, a recessed blade access region 54 is defined on the first side 22 and a corresponding recessed blade access region 54 is defined on the second side 24. Thus, each aperture includes two blade access regions, each defined on opposite sides of the tool housing. The regions provide increased access around the associated blade and improve viewing of the cutting interface. The regions also facilitate removal and displacement of material resulting from the cutting or finishing operation(s), such as shavings and debris from the pipe wall material. Preferably and as noted, each blade access region includes a pair of recessed regions or walls of the housing extending on each side of the circumferential wall. Thus, on one side of the tool a recessed region or wall extends from the circumferential wall to the first side of the housing. And on another side of the tool, a recessed region or wall extends from the circumferential wall to the second side of the housing.

Preferably, the housing 20 defines two or more apertures, such as for example apertures 40 and 50 described in conjunction with the tool 10. The apertures differ in size, i.e. one has a larger opening or span dimension than the other. Preferably, the apertures are each approximately circular in shape, and so may be defined by their respective spans. However, as noted and as described in greater detail herein, the apertures are preferably slightly non-circular. Preferably, one of the apertures is sized to accommodate 1¼ inch pipe, and the other aperture is sized to accommodate 1½ pipe. It will be appreciated that in no way is the present invention cutting tool limited to this particular configuration nor this particular combination of sizes. Instead, the present invention includes cutting tools having three, four, or more apertures, preferably all having different sizes so as to accommodate piping of different sizes. A key feature of the openings is that upon insertion of a pipe into an opening, the opening completely surrounds the pipe. This configuration serves to constrain the pipe and prevent deformation of the pipe during cutting.

The tool 10 further comprises a plurality of selectively positionable implements or blades, each of which is configured and oriented to extend into an aperture defined in the housing 20. For example, a first blade 70 is provided in association with the first aperture 40, and a second blade 80 is provided in association with the second aperture 50. Each blade defines a distal end having a working or cutting edge that can be exposed within an aperture in the tool housing, and a proximal end opposite from the distal end. Each of the blades 70, 80 is selectively positionable so that at least a portion of the blade projects within the corresponding aperture. Each blade is located proximate a corresponding blade access region, e.g. regions 44 and 54. Preferably, each blade 70, 80 is positionable in a generally radial direction with respect to its corresponding aperture. This feature is described in greater detail herein.

The tool 10 further comprises an actuator 60 for changing or otherwise adjusting the position of at least one of the implements or blades. Preferably, the actuator 60 and its associated assembly described in greater detail herein, is configured such that upon depressing the actuator 60 at least partially into the housing 20 of the tool 10, one or more of the blades retract or are otherwise withdrawn into the housing 20. The actuator 60 is preferably in the form of a movable member that is fittingly received within an actuator opening 34 defined in the housing 20. An outer exposed region of an actuator 60 may preferably be formed to include a grip-promoting surface such as including outwardly extending ridges or other projections.

The housing 20 can be formed from multiple sections or components. It is generally preferred to provide two half sections that engage one another along a longitudinal plane bisecting the housing. Thus, one half section includes the entirety of the first side 22 and one-half of the top edge 26, the bottom edge 28, the front face 30, and the rear face 32. And, the other one-half section includes the entirety of the second side 24 and one-half of the top edge 26, the bottom edge 28, the front face 30, and the rear face 32. Preferably, the housing 20 is formed from metals that can be formed or cast; or polymeric materials that can be injection molded with relatively high tolerances and which provide an aesthetically pleasing outer surface. One or more fasteners 36 can be used to attach the housing sections together.

Figure 3:
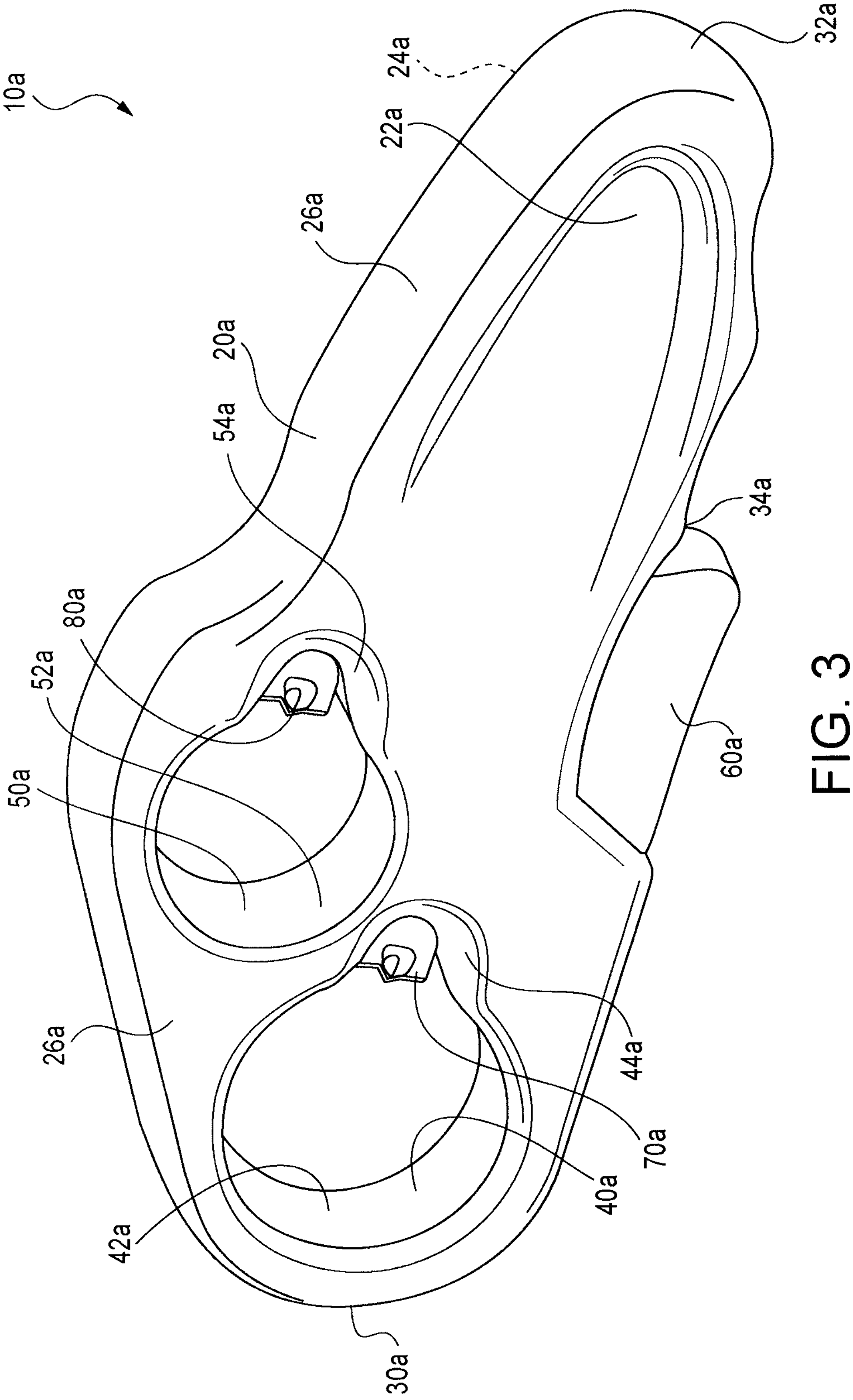
FIG. 3 is a perspective view of another preferred embodiment cutting tool in accordance with the present invention.
Figure 4:
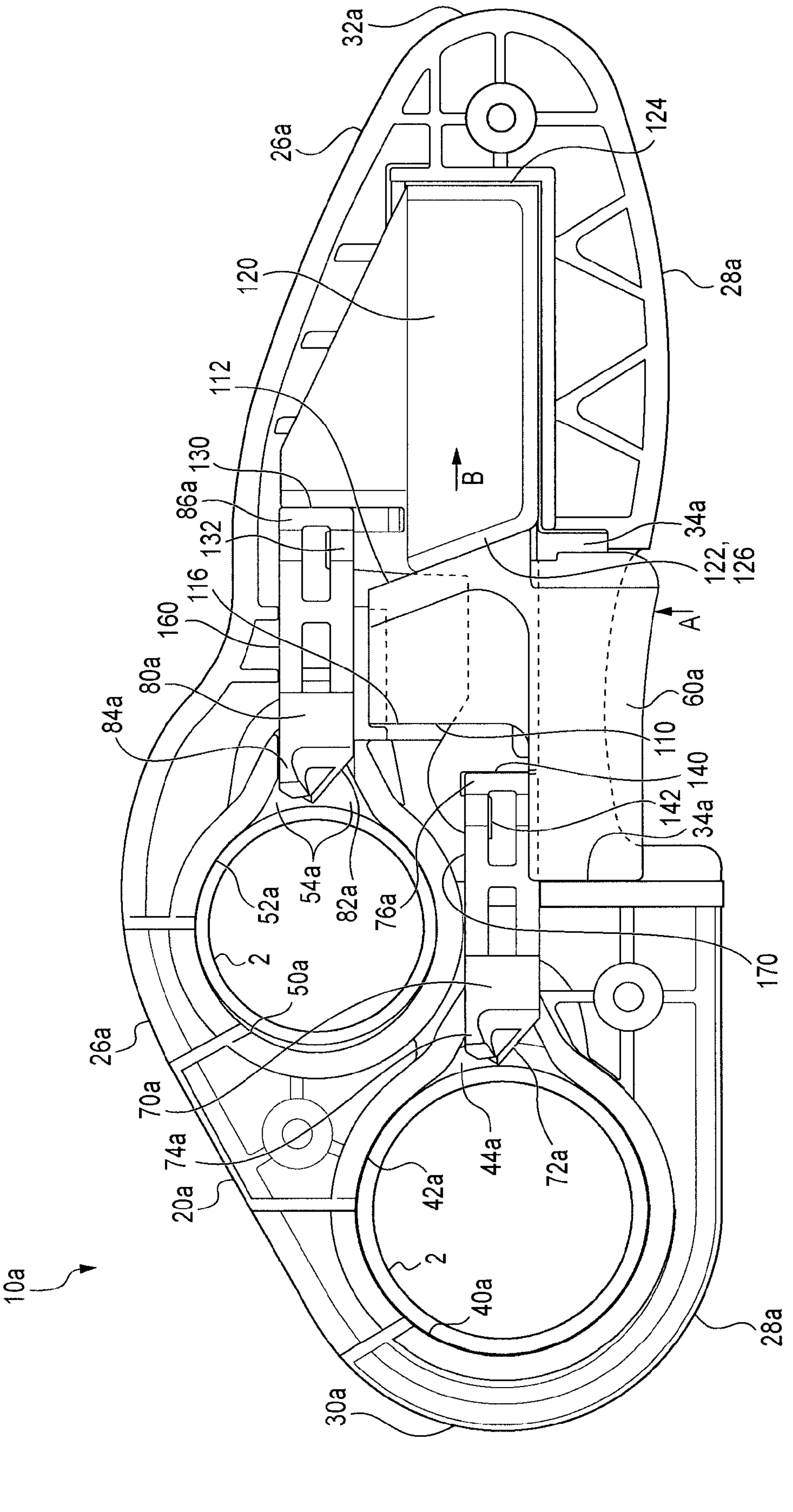
FIG. 4 is a cross sectional view taken across the longitudinal axis of the preferred embodiment cutting tool of FIG. 3 illustrating the interior of the tool and an assembly of cutting blades in a retracted position.
Figure 5:
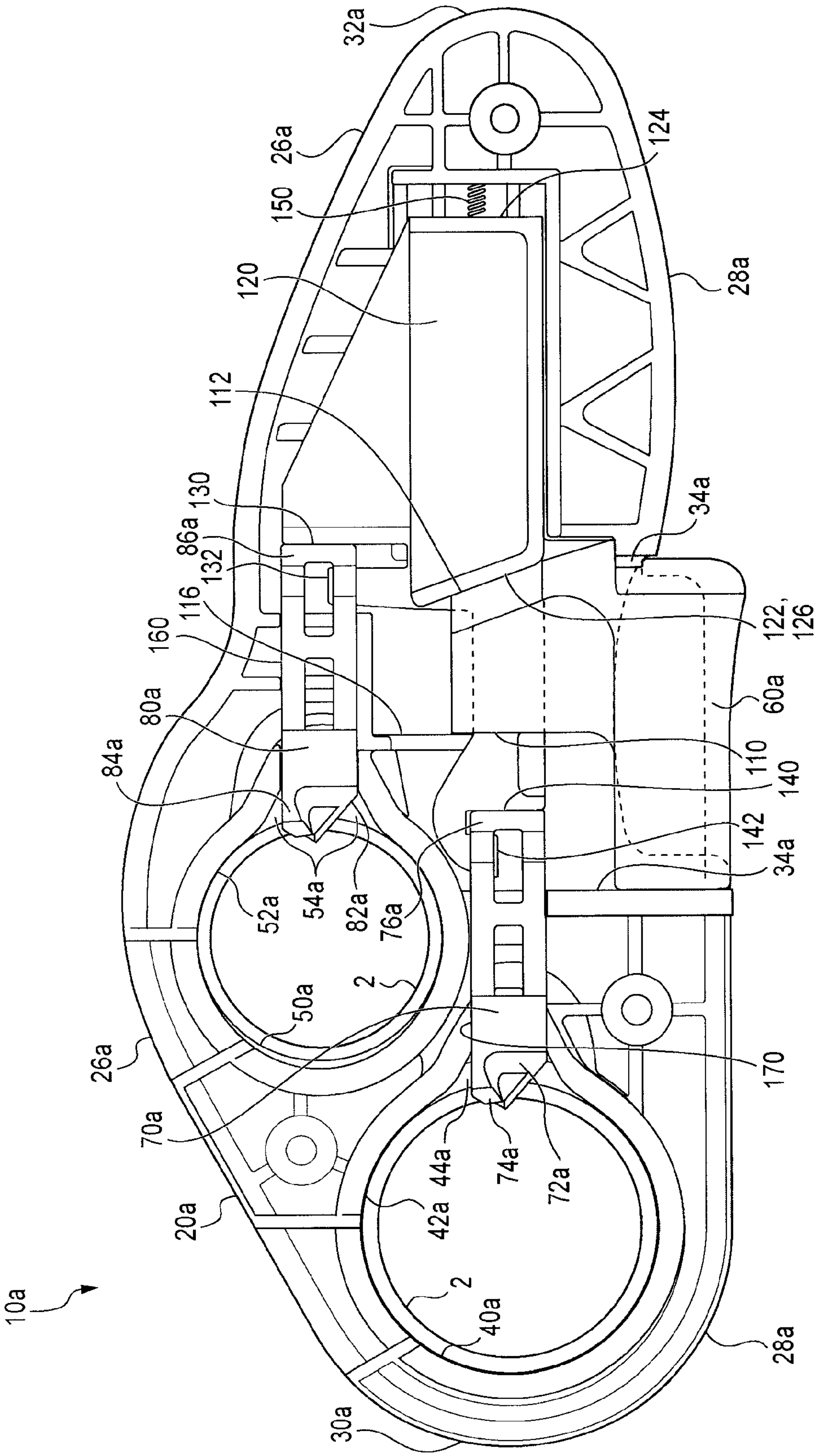
FIG. 5 is a cross sectional view taken across the longitudinal axis of the preferred embodiment cutting tool of FIG. 3 and illustrating the assembly of cutting blades in a partially extended position.

FIGS. 3-5 illustrate another preferred embodiment cutting tool 10*a* in accordance with the present invention. The preferred tool 10*a* generally corresponds to the previously described preferred embodiment tool 10 depicted in FIGS. 1-2 except for the orientation of the blade recesses. The blade recesses 44 and 54 in the tool 10 illustrated in FIGS. 1-2 are generally directed upwards and proximate the top edge 26 of the tool 10. In contrast, in the tool 10*a* illustrated in FIG. 3, the blade recesses 44*a* and 54*a* are directed toward a rear face 32*a* of the tool 10*a*. It will be appreciated that in no way is the present invention limited to any particular configuration for the blade recesses. The tool 10*a* generally corresponds to previously described tool 10. The tool 10*a* comprises a housing 20*a* defining a first side 22*a*, a second oppositely directed side 24*a*, a top edge 26*a* generally extending between the first side 22*a* and the second side 24*a*, and a bottom edge 28*a* generally oppositely directed from the top edge 26*a* and extending between the first side 22*a* and the second side 24*a*. The housing 20*a* also defines a front face 30*a* extending between the first side 22*a* and the second side 24*a* and also between the top edge 26*a* and the bottom edge 28*a*. The housing 20*a* further defines the previously noted rear face 32*a* oppositely directed from the front face 30*a*, and extending between the first side 22*a* and the second side 24*a*, and also between the top edge 26*a* and the bottom edge 30*a*. Preferably, the various sides, edges, and faces appropriately merge into one another to form an aesthetically pleasing and attractive housing or enclosure for the tool 10*a*. Rounded and/or smoothed edges and corners are preferred for certain versions of the tool.

The tool 10*a*, and particularly the housing 20*a*, defines a plurality of openings or apertures that extend through the tool, such as between the first side 22*a* and the second side 24*a*. These apertures are for receiving pipes or tubing 2 to be cut or finished. FIGS. 4 and 5 illustrate pipes 2 disposed in each of the apertures 40*a* and 50*a*. The tool 10*a* in FIG. 3 is shown without such pipes or tubes 2 to further illustrate the tool. The tool 10*a* defines a first aperture 40*a* and a second aperture 50*a*. The first aperture 40*a* is defined by an interior circumferential wall 42*a*. The interior wall 42*a* defines a blade access region 44*a*. Similarly, the second aperture 50*a* is defined by an interior circumferential wall 52*a*. The interior wall 52*a* defines a blade access region 54*a*.

Preferably, the housing 20*a* defines two or more apertures, such as for example apertures 40*a* and 50*a* described in conjunction with the tool 10*a*. The apertures differ in size, i.e. one has a larger opening or span dimension than the other. Preferably, the apertures are each approximately circular in shape, and so may be defined by their respective spans. Preferably, one of the apertures is sized to accommodate 1¼ inch pipe, and the other aperture is sized to accommodate 1½ pipe. It will be appreciated that in no way is the present invention cutting tool limited to this particular configuration nor this particular combination of sizes. Instead, the present invention includes cutting tools having three, four, or more apertures, preferably all having different sizes so as to accommodate piping of different sizes. A key feature of the openings is that upon insertion of a pipe into an opening, the opening completely surrounds the pipe. This configuration serves to constrain the pipe and prevent deformation of the pipe during cutting.

The tool 10*a* further comprises a plurality of selectively positionable implements or blades, each of which is configured and oriented to extend into an aperture defined in the housing 20*a*. For example, a first blade 70*a* is provided in association with the first aperture 40*a*, and a second blade 80*a* is provided in association with the second aperture 50*a*. Each blade defines a distal end having a working or cutting edge that can be exposed within an aperture in the tool housing, and a proximal end opposite from the distal end. Each of the blades 70*a*, 80*a* is selectively positionable so that at least a portion of the blade projects within the corresponding aperture. Preferably, each blade 70*a*, 80*a* is positionable in a generally radial direction with respect to its corresponding aperture. This feature is described in greater detail herein.

The tool 10*a* further comprises an actuator 60*a* for changing or otherwise adjusting the position of at least one of the implements or blades. Preferably, the actuator 60*a* and its associated assembly described in greater detail herein, is configured such that upon depressing the actuator 60*a* at least partially into the housing 20*a* of the tool 10*a*, one or more of the blades retract or are otherwise withdrawn into the housing 20*a*. The actuator 60*a* is preferably in the form of a movable member that is fittingly received within an actuator opening 34*a* defined in the housing 20*a*. An outer exposed region of the actuator 60*a* may preferably be formed to include a grip-promoting surface such as including outwardly extending ridges or other projections.

The housing 20*a* can be formed from multiple sections or components. It is generally preferred to provide two half sections that engage one another along a longitudinal plane bisecting the housing. Thus, one half section includes the entirety of the first side 22*a* and one-half of the top edge 26*a*, the bottom edge 28*a*, the front face 30*a*, and the rear face 32*a*. And, the other one-half section includes the entirety of the second side 24*a* and one-half of the top edge 26*a*, the bottom edge 28*a*, the front face 30*a*, and the rear face 32*a*. Preferably, the housing 20*a* is formed from metals that can be formed or cast; or polymeric materials that can be injection molded with relatively high tolerances and which provide an aesthetically pleasing outer surface. One or more fasteners (not shown) are used to secure the housing sections together. The housing may also preferably be formed from metals such as from aluminum.

FIGS. 4 and 5 illustrate an interior region of the preferred embodiment cutting tool 10*a* along a plane bisecting the tool along its longitudinal axis. FIG. 4 illustrates the tool 10*a* in a configuration in which the blades 70*a* and 80*a* are retracted resulting from pressing the actuator 60*a*. And FIG. 5 illustrates the tool 10*a* in a configuration in which the blades 70*a* and 80*a* are extended into their respective apertures 40*a* and 50*a*, and the actuator 60*a* is outwardly extended resulting from action of one or more springs or other biasing members. FIGS. 4 and 5 illustrate an implement assembly that generally includes an implement, provisions for retracting the implement into the interior region of the housing, and provisions for extending the implement into the aperture.

Preferably, the implement assembly is as follows. The actuator 60*a* defines a guide surface 110 and a cam surface 112. Preferably, the actuator guide surface 110 is disposed forwardly of the cam surface 112. Although a wide array of arrangements and configurations can be provided, it is generally preferred that the cam surface 112 extend at an acute angle relative to the guide surface 110. Typically, this angle is from about 5° to about 70° with a preferred angle in the range of from about 20° to about 40°.

The actuator 60*a* is slidably received within the housing 20*a* of the tool 10*a* such that a housing guide surface 116 is in contact with the guide surface 110 of the actuator 60*a*. Thus, upon depressing the actuator 60*a* relative to the housing, the actuator guide surface 110 moves alongside and is directed by the housing guide surface 116.

The tool 10*a* also comprises a movable slide member 120 generally retained within the interior of the tool 10*a*. The member 120 transfers movement from the actuator 60*a* to one or more springs or other biasing members generally shown as 150 in FIG. 5. Biasing member 150 can for example be in the form of a coil spring that exerts a compressive force upon the slide member 120. The member 120 also transfers movement, and more particularly force, from the one or more springs or other biasing members 150 to the blades 70*a* and 80*a*. Movement of the actuator 60*a* in the direction of arrow A in FIG. 4, causes movement of the slide member 120 in the direction of arrow B. Although this transfer of motion can be accomplished by use of a variety of different assemblies, a preferred configuration is as follows. The slide member 120 defines a first end 122 and an oppositely directed second end 124. A cam follower surface 126 is provided along the first end 122 of the member 120. The slide member 120 is positioned within the housing 20*a* such that the cam follower surface 126 is in contact with at least a portion of the actuator cam surface 112. And, the slide member 120 is preferably oriented such that the cam follower surface 126 extends at the same angle relative to the guide surface 110, as does the cam surface 112 of the actuator 60*a*. As will be appreciated, such a configuration results in the slide member 120 being displaced in the direction of arrow B upon displacement of the actuator 60*a* in the direction of arrow A shown in FIG. 4.

Referring further to FIGS. 4 and 5, the slide member 120 engages the first blade 70*a* and the second blade 80*a*. The first blade 70*a* defines a distal end 74*a* along which is provided a working edge 72*a*, and an opposite proximal end 76*a*. Similarly, the second blade 80*a* defines a distal end 84*a* along which is provided a working edge 82*a*, and an opposite proximal end 86*a*. Preferably, the slide member 120 includes mounting provisions 140 for the first blade 70*a* and mounting provisions 130 for the second blade 80*a*. Each of the blades is slidably disposed within a corresponding blade receiving region defined within the housing 20*a*. Thus, the first blade 70*a* is slidably disposed in a blade guide channel 170, and the second blade 80*a* is slidably disposed in a blade guide channel 160. Each blade is positioned such that it extends between its corresponding aperture defined in the housing and the slide member 120 and particularly a corresponding mounting provision of the slide member 120. Thus, the first blade 70*a* extends between the first aperture 40*a* and the mounting provision 140 of the slide member 120. And, the second blade 80*a* extends between the second aperture 50*a* and the mounting provision 130 of the slide member 120. Preferably, the first blade 70*a* is engaged at the mounting provision 140 of the slide member 120 by a blade engagement member 142. And, preferably, the second blade 80*a* is engaged at the mounting provisions 130 of the slide member 120 by a blade engagement member 132.

It is contemplated that the tool 10 illustrated in FIGS. 1-2 can utilize a similar mechanism with appropriate provisions for redirecting component movements for retracting and extending the blades 70 and 80.

Figure 16:
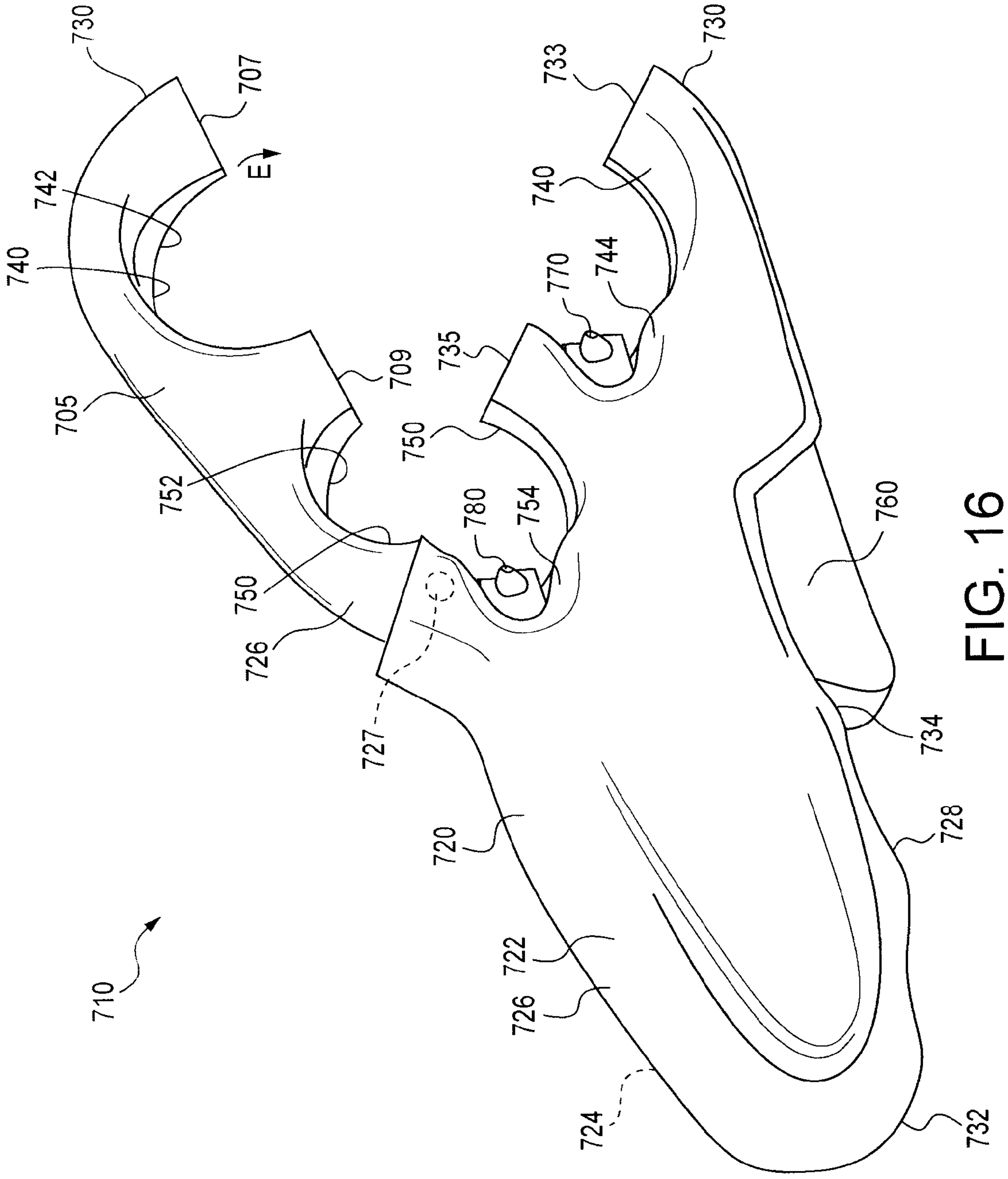
FIG. 16 is a perspective view of another preferred embodiment cutting tool in accordance with the present invention.

FIG. 16 illustrates another preferred embodiment cutting tool 710 in accordance with the present invention. The preferred tool 710 generally corresponds to the previously described preferred embodiment tools 10 and 10*a* depicted in FIGS. 1-2 and 3-5, respectively, except for a unique housing feature. The tool 710 as shown in FIG. 16 includes a selectively positionable housing section that enables access to the one or more apertures in the housing. This feature enables the tool 710 to be readily positioned about the pipe or tubing in applications in which the end of the pipe or tubing is not accessible or if the end includes a bulky fitting for example. Preferably, each of the positionable housing section and one or more other housing section(s) define portions of the apertures of the housing body. Upon opening the positionable section, each of the apertures can be radially accessed. It will be appreciated that in no way is the present invention limited to any particular configuration for the positionable housing section(s).

The tool 710 comprises a housing 720 defining a first side 722, a second oppositely directed side 724, a top edge 726 generally extending between the first side 722 and the second side 724, and a bottom edge 728 generally oppositely directed from the top edge 726 and extending between the first side 722 and the second side 724. The housing 720 also defines a front face 730 extending between the first side 722 and the second side 724 and also between the top edge 726 and the bottom edge 728. The housing 720 further defines a rear face 732 oppositely directed from the front face 730, and extending between the first side 722 and the second side 724, and also between the top edge 726 and the bottom edge 730. Preferably, the various sides, edges, and faces appropriately merge into one another to form an aesthetically pleasing and attractive housing or enclosure for the tool 10*a*. Rounded and/or smoothed edges and corners are preferred for certain versions of the tool.

Specifically, the housing 720 includes a positionable housing section 705 that is preferably movably affixed to the other portion(s) of the housing 720 at a pivot pin 727 or other component. Thus, the positionable housing section 705 can be moved from its open state depicted in FIG. 16 to a closed state by movement of the section 705 in the direction of arrow E. As will be understood, the main section of the housing 720 defines one or more engagement surfaces 735 and 733, which upon closing the section 705 in the direction of arrow E, contact and engage corresponding surfaces 709 and 707 of the section 705.

The tool 710, and particularly the housing 720, defines a plurality of openings or apertures that extend through the tool, such as between the first side 722 and the second side 724. These apertures are for receiving pipes or tubing to be cut or finished. For example, the tool 710 defines a first aperture 740 and a second aperture 750. The first aperture 740 is defined by an interior circumferential wall 742. The interior wall 742 defines a blade access region 744. Similarly, the second aperture 750 is defined by an interior circumferential wall 752. The interior wall 752 defines a blade access region 754. Upon closing the tool, the apertures are fully enclosed.

Preferably, the housing 720 defines two or more apertures, such as for example apertures 740 and 750 described in conjunction with the tool 710. The apertures differ in size, i.e. one has a larger opening or span dimension than the other. Preferably, the apertures are each approximately circular in shape, and so may be defined by their respective spans. Preferably, one of the apertures is sized to accommodate 1¼ inch pipe, and the other aperture is sized to accommodate 1½ pipe. It will be appreciated that in no way is the present invention cutting tool limited to this particular configuration nor this particular combination of sizes. Instead, the present invention includes cutting tools having three, four, or more apertures, preferably all having different sizes so as to accommodate piping of different sizes. A key feature of the openings is that upon closure of the tool 710, insertion of a pipe into an opening, the opening completely surrounds the pipe. This configuration serves to constrain the pipe and prevent deformation of the pipe during cutting.

The tool 710 further comprises a plurality of selectively positionable implements or blades, each of which is configured and oriented to extend into an aperture defined in the housing 720. For example, a first blade 770 is provided in association with the first aperture 740, and a second blade 780 is provided in association with the second aperture 750. Each blade defines a distal end having a working or cutting edge that can be exposed within an aperture in the tool housing, and a proximal end opposite from the distal end. Each of the blades 770, 780 is selectively positionable so that at least a portion of the blade projects within the corresponding aperture. Preferably, each blade 770, 780 is positionable in a generally radial direction with respect to its corresponding aperture. This feature is described in greater detail herein.

The tool 710 further comprises an actuator 760 for changing or otherwise adjusting the position of at least one of the implements or blades. Preferably, the actuator 760 and its associated assembly is as previously described in association with FIGS. 4 and 5, and is configured such that upon depressing the actuator 760 at least partially into the housing 720 of the tool 710, one or more of the blades retract or are otherwise withdrawn into the housing 720. The actuator 760 is preferably in the form of a movable member that is fittingly received within an actuator opening 734 defined in the housing 720. An outer exposed region of the actuator 760 may preferably be formed to include a grip-promoting surface such as including outwardly extending ridges or other projections. It will be appreciated that the blades, i.e. blades 770 and 780, can be configured such that their movement is a result of displacement of the actuator 760, movement of the housing section 705, and/or by other components. It is also contemplated that one or more of the blades could be biased in an outwardly extending state by springs or the like. In such a configuration, upon placement of a pipe or tube in the aperture portion in the opened tool and prior to closing of the housing section 705, the blade is then urged or otherwise depressed into the housing as a result of contact with the pipe. It will be appreciated that the present invention includes a wide range of housing and tool configurations.

The housing 720 can be formed from multiple sections or components as previously described in conjunction with tools 10 and 10*a*. It is generally preferred to provide two half sections that engage one another along a longitudinal plane bisecting the housing.

Implements

The present invention also provides various working implements such as cutting blades, chamfering edges, reamers, finishing tools and cutting wheels that are preferred for use in the cutting tools described herein. The term "implement" as used herein generally refers to a component or member that is used in the tool to perform a desired action upon a pipe or tube of interest. For example, the term "implement" includes a member having a cutting tip, a cutting blade, and/or a cutting wheel that when contacted and urged against the circumferential wall of the pipe or tubing, serves to cut or otherwise sever the pipe or tubing. Similarly, the term "implement" includes a member having a shaping or working edge that when contacted and urged against the circumferential wall or an axial face of the pipe or tubing, shapes or otherwise alters the configuration of the wall or face. Examples of several preferred implements suitable for use with the present invention tool are as follows.

Figure 6:
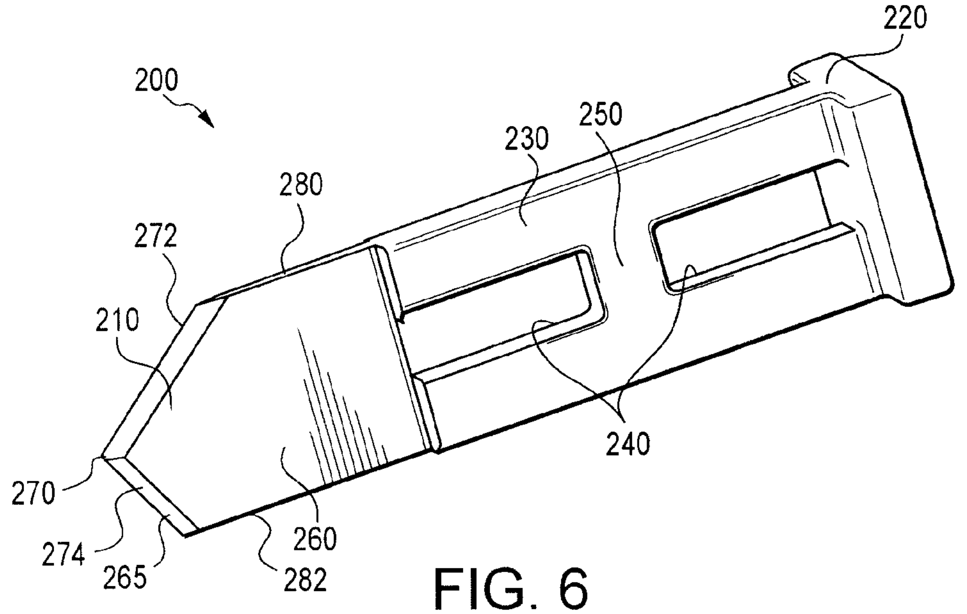
FIG. 6 is a perspective view of a preferred embodiment implement used in the cutting tool of the present invention.

FIG. 6 illustrates a preferred embodiment implement 200 for use in the previously described cutting tools 10, 10*a*, and 710. The implement 200 includes a longitudinal member 230 generally extending between a first end 210 and an opposite second end 220. The longitudinal member 230 may define one or more material-saving open spans 240 and one or more strength-promoting reinforcing regions 250. The implement 200 includes a cutting member 260 generally located at the first end 210. The cutting member 260 preferably defines a cutting edge 265. The second end 220 of the blade 200 is preferably shaped for engagement and contact with the previously described slide member 120, and specifically, with the mounting provisions 130, 140 of the slide member 120.

The implement 200 is characterized as having a distalmost cutting tip 270 separating a major cutting edge 272 and a minor cutting edge 274. The major cutting edge 272 extends between a first or top edge 280 of the implement and the distalmost point 270. The minor cutting edge 274 extends between a second or bottom edge 282 of the implement and the distalmost point 270. The length of the major cutting edge 272 is preferably greater than the length of the minor cutting edge 274. Preferably, the major and minor cutting edges 272 and 274, respectively, are oriented at an angle with respect to each other of from about 30° to about 120°, with about 110° to about 90° being most preferred. Preferably, the length of the major cutting edge 272 is from about 150% to about 300% of the length of the minor cutting edge 274. Furthermore, it is contemplated that different edge configurations can be provided along the major and minor cutting edges. Providing different cutting profiles and cutting edge orientations relative to the pipe or tube to be cut increases the utility and applicability of the present invention tool. Moreover, the provision of the cutting tip 270 is also beneficial since the tip 270 initially scores and forms a valley-like depression along the outer surface of the pipe during initial stages of cutting. As cutting continues, depending upon the direction of movement of the tool relative to the pipe, either the major cutting edge 272 or the minor cutting edge 274 will then follow within the previously formed depression.

Figure 7:
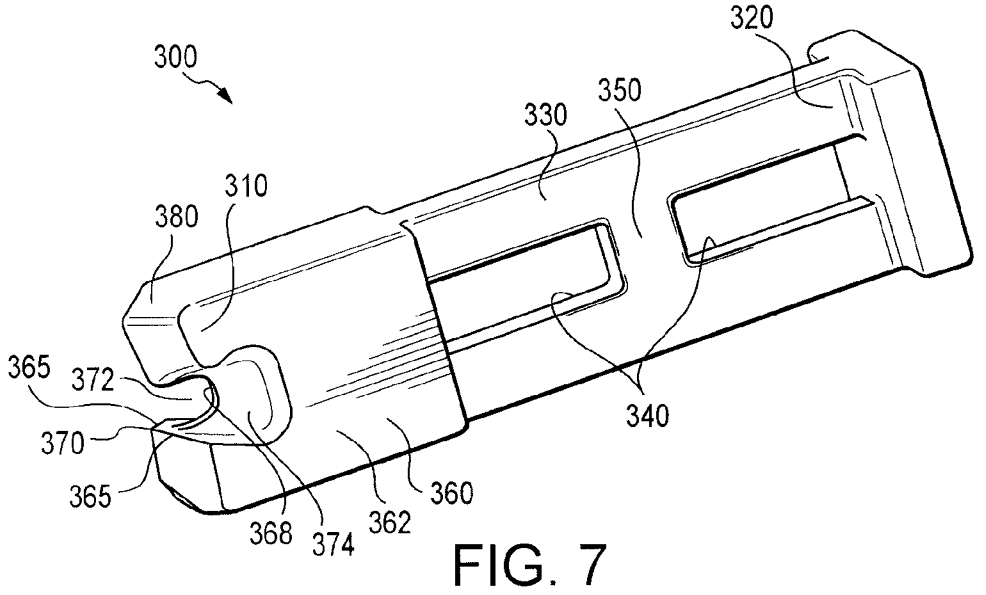
FIG. 7 is a perspective view of another preferred embodiment implement used in the cutting tool of the present invention.

FIG. 7 illustrates another preferred embodiment implement 300 for use in the previously described cutting tools 10, 10*a*, and 710. The implement 300 includes a longitudinal member 330 generally extending between a first end 310 and an opposite second end 320. The longitudinal member may 330 define one or more material-saving open spans 340 and one or more strength-promoting reinforcing regions 350. The blade 300 includes a cutting member 360 generally located at the first end 310. The cutting member preferably defines a cutting edge 365 and an outwardly extending distalmost point 370. The second end 320 of the blade 300 is preferably shaped for engagement and contact with the previously described slide member 120, and specifically, with the mounting provisions 130, 140 of the slide member 120.

The implement 300 is characterized as having a lathe and limiter blade end region. The implement 300, and specifically the cutting member 360, defines a cutting edge 365 that extends between a distalmost point 370 and an interior region 372 within the cutting member 360. The cutting edge 365 is preferably in the form of a V-shape with the center of the cutting edge 365 coinciding with the distalmost point 370. Extending from the distalmost point 370 and generally into the interior region 372 of the cutting member 360 is a material deflection structure 368 which generally defines a first wall 374 extending to a first planar face 362 of the cutting member 360 and a second wall (not shown) extending to a second planar face (not shown) of the cutting member 360. The implement 300, and specifically the cutting member 360, also includes a blade limiter member 380 that overlies the cutting edge 365. The blade limiter member 380 serves to limit the depth of cut of the cutting edge 365. Preferably, the limiter member 380 also exhibits a V-shape as shown in FIG. 7.

Figure 8:
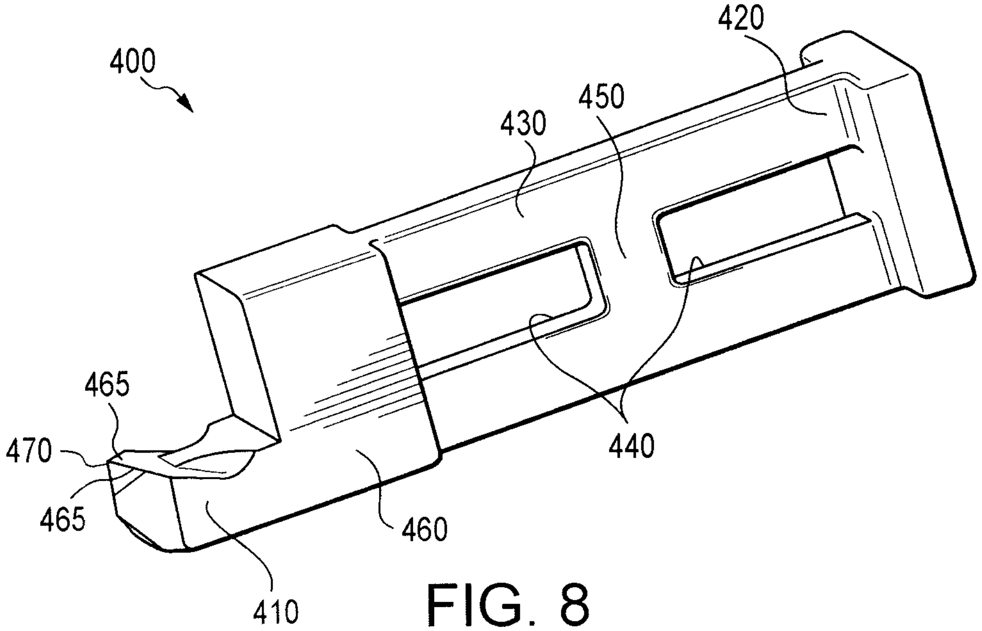
FIG. 8 is a perspective view of another preferred embodiment implement used in the cutting tool of the present invention.

FIG. 8 illustrates another preferred embodiment implement 400 for use in the previously described cutting tools 10, 10*a* and 710. The implement 400 includes a longitudinal member 430 generally extending between a first end 410 and an opposite second end 420. The longitudinal member 430 may define one or more material-saving open spans 440 and one or more strength-promoting reinforcing regions 450. The implement 400 includes a cutting member 460 generally located at the first end 410. The cutting member preferably defines a cutting edge 465. The second end 420 of the blade 400 is preferably shaped for engagement and contact with the previously described slide member 120, and specifically, with the mounting provisions 130, 140 of the slide member 120.

The implement 400 of FIG. 8 is characterized as having a cutting edge 465 and free of any type of limiter member such as limiter member 380 shown in FIG. 7. The cutting edge 465 is preferably in the form of a V-shape and generally extends from a distalmost point 470 to the planar sides of the cutting member 460. Preferably, the center of the cutting edge 465 coincides with the distalmost point 470.

Figure 9:
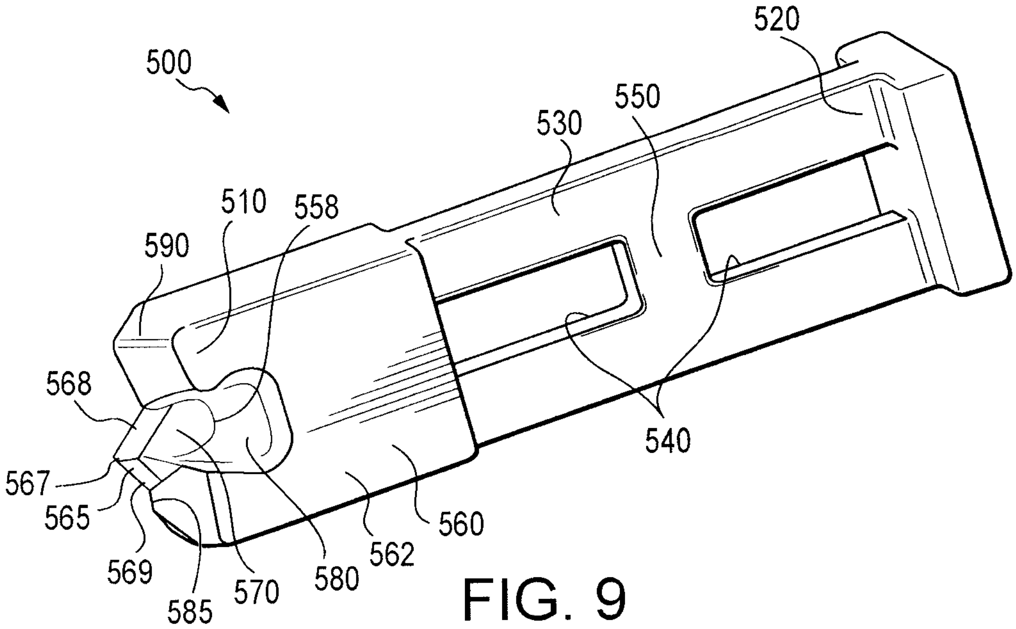
FIG. 9 is a perspective view of another preferred embodiment implement used in the cutting tool of the present invention.

FIG. 9 illustrates another preferred embodiment implement 500 for use in the previously described cutting tools 10, 10*a* and 710. The implement 500 includes a longitudinal member 530 generally extending between a first end 510 and an opposite second end 520. The longitudinal member 530 may define one or more material-saving open spans 540 and one or more strength-promoting reinforcing regions 550. The implement 500 includes a cutting member 560 generally located at the first end 510. The cutting member 560 preferably defines a cutting edge 565. The second end 520 of the implement 500 is preferably shaped for engagement and contact with the previously described slide member 120, and specifically, with the mounting provisions 130, 140 of the slide member 120.

The implement 500 of FIG. 9 is characterized as having a blade component 570 in combination with material deflection walls 580 disposed on each side of the blade component 570. The implement 500 also features a limiter 590 and a reamer 585. The limiter 590 serves to limit the depth of the blade component 570 and also of the reamer 585. The reamer 585 serves to finish the cut end face of the pipe or tube. The operation of these members is described in greater detail in conjunction with FIGS. 11-14. The blade component 570 defines a cutting edge 565 that includes a distalmost end 567. The edge 565 thus includes a first edge section 568 and a second edge section 569. The limiter 590 is preferably V-shaped. The blade component 570 may utilize a configuration like that of the cutting edge 265 of the implement 200 described in conjunction with FIG. 6. The implement 500 further features a chip removal feature similar to the material deflection structure 368 described in conjunction with the implement 300 depicted in FIG. 7. Specifically, the implement 500 includes a material deflection structure 558 that generally extends on each side of the blade component 570 and transitions into the material deflection walls 580. As will be understood, each of the material deflection walls 580 extends between the structure 558 and a corresponding planar face 562 of the cutting member 560. As the blade 570 cuts and separates material from a pipe or tube undergoing a cutting or finishing operation, the deflection structure 558 contacts and directs the material away from the cutting interface. The material may be further directed away by the deflection walls 580.

Figure 11:
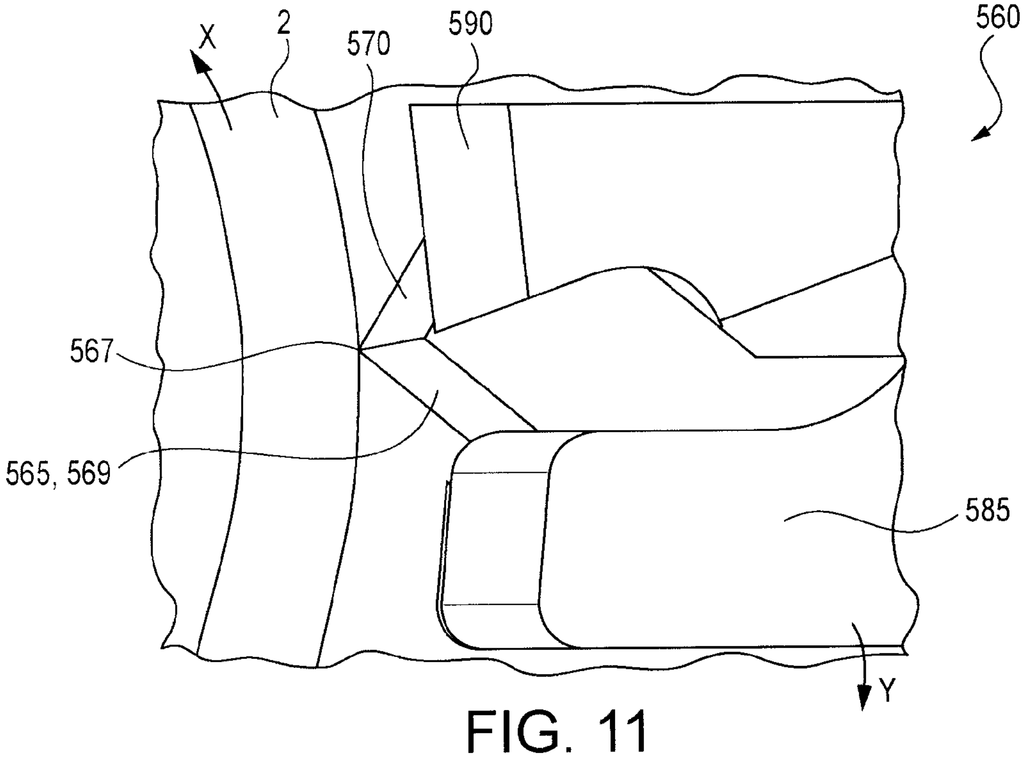
FIGS. 11-14 illustrate an interface between a pipe and a preferred embodiment implement at various stages of cutting and finishing.
Figure 12:
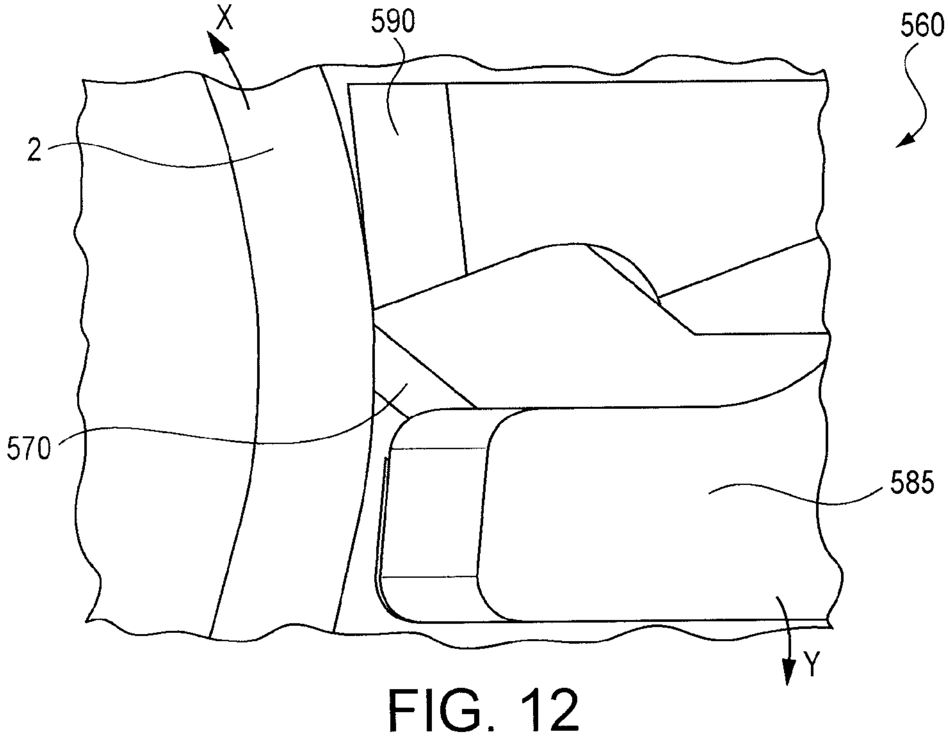
Figure 13:
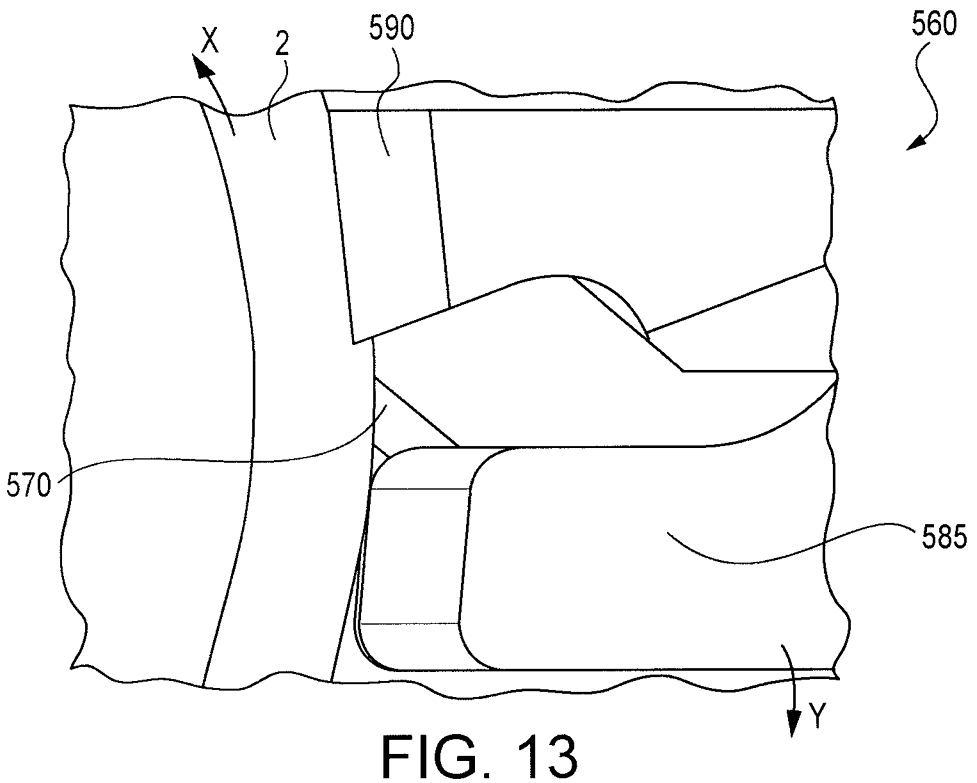
Figure 14:
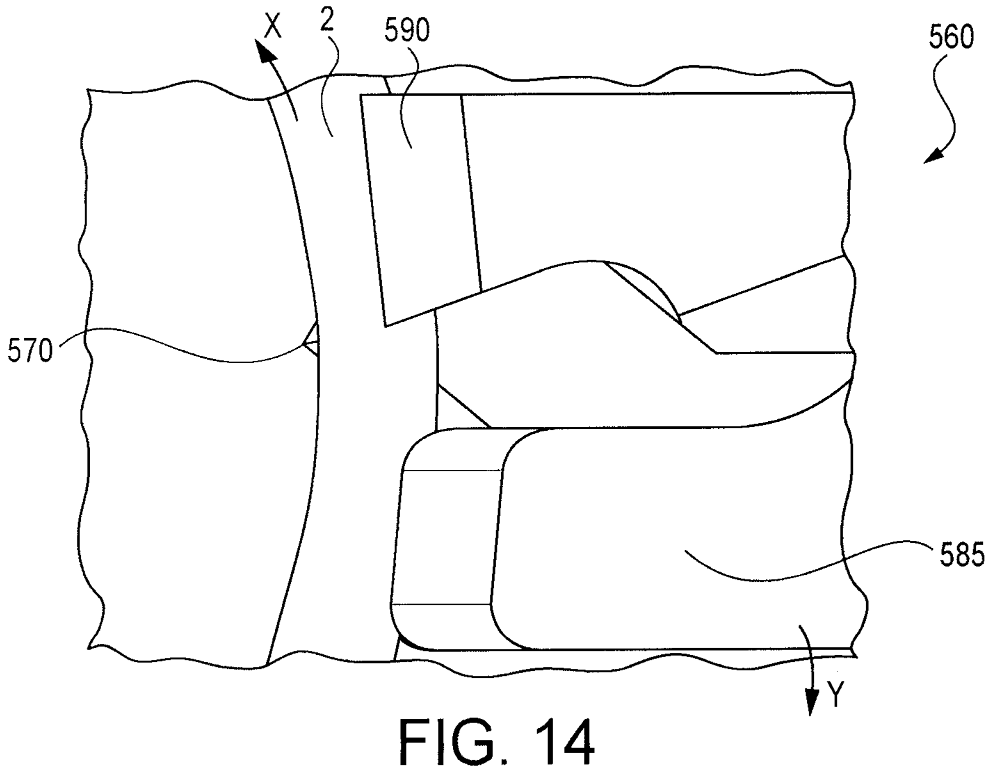

The operation of the implement 500 is schematically depicted in FIGS. 11-14 which detail contact and working of the member 560 upon a pipe 2. Referring to FIG. 11, after positioning a pipe 2 within an aperture of the cutting tool and upon release of the tool actuator, such as actuator 60 in FIG. 1, the distalmost end 567 of the blade 570 contacts the outer surface of the pipe 2. Upon orbiting of the tool about the pipe 2 in the direction of arrow Y, the blade 570 begins to penetrate the wall of the pipe. Alternatively or in combination, the pipe 2 can be rotated about its longitudinal axis in the direction of arrow X. FIG. 12 illustrates pipe wall penetration until contact occurs between the reamer 590 and the pipe 2, and specifically, the newly exposed cut surface of the pipe. At this juncture, the reamer 590 contacts the pipe 2 and begins to chamfer the cut face or region of the pipe. FIG. 13 illustrates the limiter 585 contacting the chamfered edge, thereby restricting the reamer cut depth. And, FIG. 14 illustrates penetration of the blade 570 and specifically, the blade distalmost end 567, through the pipe wall. The pipe 2 at this juncture has now been cut and reamed.

Figure 10:
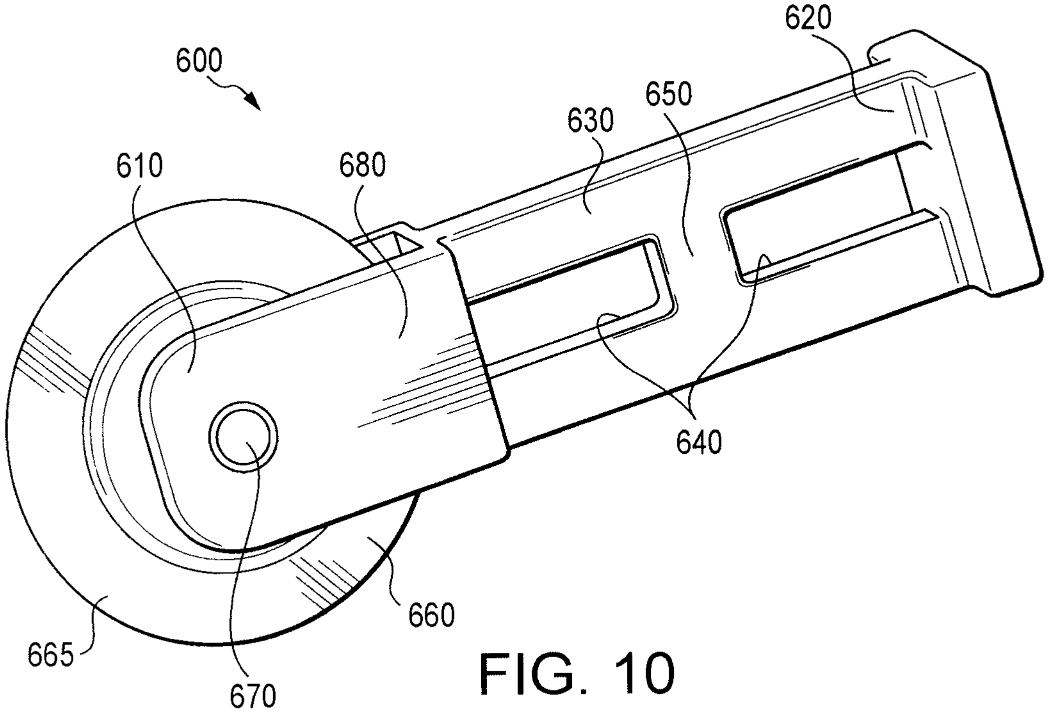
FIG. 10 is a perspective view of another preferred embodiment implement used in the cutting tool of the present invention.

FIG. 10 illustrates another preferred embodiment implement 600 for use in the previously described cutting tools 10, 10*a*, and 710. The implement 600 includes a longitudinal member 630 generally extending between a first end 610 and an opposite second end 620. The longitudinal member may define one or more material-saving open spans 640 and one or more strength-promoting reinforcing regions 650. The blade 600 includes a cutting member 660 generally located at the first end 610. The cutting member preferably defines a cutting edge 665. The second end 620 of the blade 600 is preferably shaped for engagement and contact with the previously described slide member 120, and specifically, with the mounting provisions 130, 140 of the slide member 120.

The implement 600 illustrated in FIG. 10 is characterized as having a rotatable cutting wheel 660 defining a cutting edge 665. The wheel 660 is preferably rotatable about and supported on an axle 670 or similar structure. The axle 670 is preferably carried by a carriage 680 which in turn is coupled to the longitudinal member 630.

Methods

The present invention cutting tool is used to cut, sever, work, and/or finish pipes or tubing, or the end(s) of a pipe or tube. Appropriate selection of one or more implements enables a user to cut a pipe and/or smooth or chamfer a cut end or face of a pipe or tube as desired. Generally, the preferred embodiment tool 10, 10*a*, 710 is used as follows. The tool 10, 10*a*, 710 is obtained and/or positioned near a pipe or tube to be cut. Preferably, although not required, a line or other marking is placed or formed along an exterior region of the pipe denoting the desired location for cutting. Depending upon the diameter of the pipe, the appropriate cutting aperture of the tool is identified for receiving the pipe. The actuator 60, 60*a*, 760 of the tool is depressed to thereby retract one or both of the blades or implements into the tool housing. An end of the pipe is inserted into the aperture and the tool 10, 10*a*, 710 positioned along the length of the pipe until the marking on the pipe is located within the aperture. The previously described blade access regions improve viewing of the relative locations of the blade or implement and the marking. Once the tool 10, 10*a*, 710 is appropriately positioned relative to the pipe, the actuator 60, 60*a*, 760 is released to thereby allow the blade corresponding to the selected aperture to travel to its biased extended state until the blade contacts the pipe, and preferably at the same or desired location as the marking. The tool 10, 10*a*, 710 is then rotated about the longitudinal axis of the pipe, which as previously mentioned, is referred to herein as "orbiting." Alternatively, the pipe can be rotated about its longitudinal axis while the tool is stationary or also moving. The biasing of the blade or implement against the pipe urges the cutting edge or working portion of the blade or implement into and/or against the pipe material, thereby resulting in cutting or other desired action. Orbiting of the tool 10, 10*a*, 710 and/or movement of the pipe is continued until the pipe has been cut or an end sufficiently finished.

Additional Features

Additional description of several features of the present invention tools is warranted. The blade access regions such as regions 44 and 54 in the tool 10, regions 44*a* and 54*a* in the tool 10*a*, and 744 and 754 in the tool 710, preferably include inwardly converging side walls that extend from the outer housing walls. This particular configuration has been found to facilitate shedding of material, i.e. pipe or tube wall material, away from the cutting or working environment. Transport of cutting or working material debris reduces the potential for interference between the implement and the pipe or tube being cut, finished, or otherwise worked. In addition, the blade access regions improve visibility of the implement and cutting or working environment and particularly at the interface along the pipe or tube at which cutting or working occurs. As previously noted, the blade access regions can be oriented and located about the periphery of an aperture at any location, such as for example, in a top central location as shown in FIGS. 1 and 2, or in a rearwardly directed orientation as shown in FIG. 3. The rearwardly directed orientation depicted in FIGS. 3-5 is most preferred. The present invention includes other orientations for the blade access regions.

Figure 15:
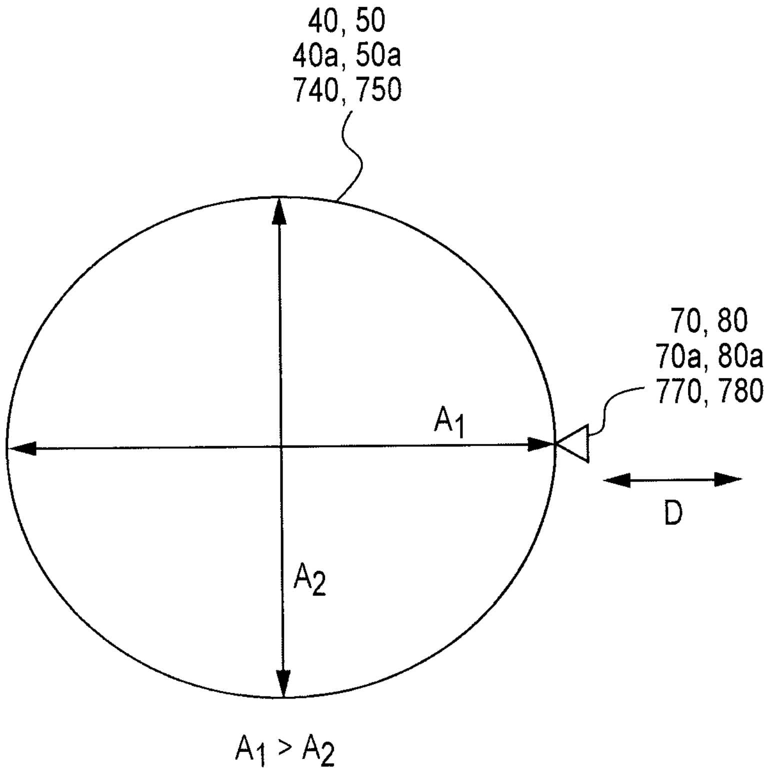
FIG. 15 is a schematic illustration of a preferred configuration for a cutting aperture in accordance with the present invention.

Another significant feature of the present invention tool is the provision of one or more apertures such as apertures 40 and 50 in the tool 10, apertures 40*a* and 50*a* in the tool 10*a*, or apertures 740 and 750 in the tool 710, that are non-circular and preferably slightly oval in shape. It has been discovered that when cutting or otherwise working a flexible pipe or tube or a pipe or tube having a relatively thin wall, the pipe deforms and is displaced away from the implement. This in turn typically results in a poor cut or other operation as the pipe wall can move relative to the implement. In accordance with the present invention, by utilizing an appropriately sized non-circular aperture, the pipe must then be slightly deformed from its generally circular cross sectional shape in order to insert the pipe into the aperture. Upon inserting the deformed pipe into the aperture, internal stresses in the pipe wall material, induced as a result of the deformation, are then applied against the interior surface(s) of the aperture, thereby frictionally engaging the outer surface of the pipe to the interior surface of the aperture. Additional reasons for use of a non-circular shape for the cutting aperture is that such a shape promotes alignment of the pipe in the cutter tool. An otherwise loose fit in a circular shaped opening could allow the axis of the pipe to be skewed with respect to the implement and result in a spiral cut or work path. Thus, in accordance with the invention, each aperture preferably has a non-circular cross-sectional shape which can generally be defined by a minor axis and a major axis. Referring to FIG. 15, this relationship is illustrated. Aperture 40 (which also corresponds to any of apertures 50, 40*a*, 50*a*, 740, and/or 750) is preferably non-circular in shape and defines a major axis $A_1$ and a minor axis $A_2$. The length of the major axis $A_1$ is greater than the length of the minor axis $A_2$, thus $A_1 > A_2$. Typically, the length of the major axis $A_1$ is from about 101% to about 110%, preferably from about 102% to about 106%, and most preferably from about 103% to about 105% of the nominal outside diameter of the pipe or tubing to be cut. Thus for example, for a pipe having a nominal outside diameter of 1.5 inches, the major axis $A_1$ of the aperture for receiving that pipe is 1.55 inches. And for pipe having a nominal outside diameter of 1.25 inches, the major axis $A_1$ is most preferably 1.30 inches. Typically, the length of the minor axis $A_2$ is from about 95% to about 99.5%, preferably from about 97% to about 99%, and most preferably about 98% of the nominal outside diameter of the pipe or tubing to be cut. Thus for example, for a pipe having a nominal outside diameter of 1.5 inches, the minor axis $A_2$ of the aperture for receiving that pipe is 1.48 inches. And for a pipe having a nominal outside diameter of 1.25 inches, the minor axis $A_2$ is 1.23 inches.

The typical, preferred, and most preferred lengths for the major and minor axes $A_1$ and $A_2$, respectively, can be expressed relative to one another. Thus, typically, the length of the major axis $A_1$ to the minor axis $A_2$ is from about 101% to about 116%, preferably from about 103% to about 109%, and most preferably from about 104% to about 107%.

Related to this feature of the use of a non-circular cutting aperture, it is also preferred that the cutting aperture is oriented such that its major axis $A_1$ is generally parallel to the axis along which the implement travels during extension into the aperture. Referring to FIG. 15 again, an implement such as blades 70, 80, 70*a*, 80*a*, 770 and/or 780, is displaceable along an axis of travel D. Thus, it is preferred that the aperture 40 and/or the implement be oriented such that the axis of travel D of the implement is parallel, or at least substantially so, to the major axis $A_1$.

It will be appreciated that although the use of slightly non-circular or oval shaped openings is preferred, the present invention includes the use of circular openings for one or more of the apertures provided in the present invention tool.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A cutting tool comprising:

a body defining a first side and a second side oppositely directed from the first side, the body also defining one or more openings through the body between the first side and the second side;

at least one selectively positionable implement, the implement positionable between (i) a first position in which the implement is disposed entirely within the body, and (ii) a second position in which at least a portion of the implement is extended into and exposed within the opening in the body;

wherein the one or more openings has a semi-circular profile, and defines a major axis and a minor axis, the length of the major axis being from about 101% to about 116% of the length of the minor axis.

2. The cutting tool of claim 1 wherein the body defines two openings.

3. The cutting tool of claim 2 wherein each of the two openings has a semi-circular profile.

4. A cutting tool comprising:

a housing defining (i) an interior region sized and shaped for receiving at least one implement, (ii) a first aperture extending through the housing, the first aperture defined by a first span, and (iii) a second aperture extending through the housing, the second aperture defined by a second span different than the first span; and an implement assembly disposed in the housing, the implement assembly including (i) a first implement and a second implement, (ii) provisions for retracting the first implement and the second implement into the interior region defined by the housing, and (iii) provisions for extending the first implement into the first aperture and the second implement into the second aperture, wherein the first implement and the second implement are biased to extend into the first aperture and the second aperture, respectively;

an actuator generally retained at least partially within the housing and in engagement with the implement assembly, wherein the implement assembly further includes a slidable member in contact with the actuator;

a spring disposed within the housing and in contact with the slidable member and which urges the slidable member to a position such that the first and second implements extend into an associated aperture.

5. A cutting tool comprising:

a housing defining (i) an interior region sized and shaped for receiving at least one implement, (ii) a first aperture extending through the housing, the first aperture defined by a first span, and (iii) a second aperture extending through the housing, the second aperture defined by a second span different than the first span; and an implement assembly disposed in the housing, the implement assembly including (i) a first implement and a second implement, (ii) provisions for retracting the first implement and the second implement into the interior region defined by the housing, and (iii) provisions for extending the first implement into the first aperture and the second implement into the second aperture, wherein the first implement and the second implement are biased to extend into the first aperture and the second aperture, respectively, and at least one of the first aperture and the second aperture has a substantially semi-circular profile defined by a major axis and a minor axis, the length of the major axis being from about 101% to about 116% of the length of the minor axis.

6. The cutting tool of claim 5 wherein the length of the major axis is from about 103% to about 109% of the length of the minor axis.

7. The cutting tool of claim 5 wherein the first implement is extendable into the first aperture and is displaced along a travel axis during retracting and extending, the first aperture having a substantially semi-circular shape and oriented such that the major axis of the first axis is generally parallel to the travel axis.

8. A cutting tool comprising:

a housing defining (i) an interior region sized and shaped for receiving at least one implement, (ii) a first aperture extending through the housing, the first aperture defined by a first span, and (iii) a second aperture extending through the housing, the second aperture defined by a second span different than the first span; and an implement assembly disposed in the housing, the implement assembly including (i) a first implement and a second implement, (ii) provisions for retracting the first implement and the second implement into the interior region defined by the housing, and (iii) provisions for extending the first implement into the first aperture and the second implement into the second aperture, wherein the first implement and the second implement are biased to extend into the first aperture and the second aperture, respectively;

an actuator generally retained at least partially within the housing and in engagement with the implement assembly, wherein the implement assembly further includes a slidable member in contact with the actuator, and the slidable member engages and contacts the implement assembly;

wherein the housing includes a first side and a second side and the first aperture is defined by a circumferential wall extending through the housing and between the first and second sides, the housing also defining a blade access region associated with the first aperture and extending between (i) the circumferential wall and the first side and (ii) the circumferential wall and the second side.

9. The cutting tool of claim 8 wherein the second aperture is defined by a circumferential wall extending through the housing and between the first and second sides, the housing also defining a second blade access region associated with the second aperture and extending between (i) the circumferential wall and the first side and (ii) the circumferential wall and the second side.

10. A cutting tool comprising:

a tool housing defining an interior hollow region, the tool housing also defining at least two apertures extending through the tool housing;

a first movable implement defining a cutting edge, the implement positionable between (i) a first position in which the implement is disposed entirely within the interior hollow region defined by the tool housing, and (ii) a second position in which at least a portion of the cutting edge is exposed within at least one of the apertures;

a second movable implement defining a cutting edge; and a spring disposed in the tool housing, the spring biasing at least one of the first and the second movable implements to extend into a respective aperture;

wherein the tool housing defines a first aperture and a second aperture and the first aperture is larger than the second aperture.

11. A cutting tool comprising:

a tool housing defining an interior hollow region, the tool housing also defining at least two apertures extending through the tool housing, including a first aperture and a second aperture;

a first movable implement defining a cutting edge, the implement positionable between (i) a first position in which the implement is disposed entirely within the interior hollow region defined by the tool housing, and (ii) a second position in which at least a portion of the cutting edge is exposed within at least one of the apertures;

a second movable implement defining a cutting edge, wherein the first aperture is a circular opening, and the second aperture is a circular opening, wherein the diameter of the first aperture is smaller than the diameter of the second aperture.

12. A cutting tool comprising:

a tool housing defining an interior hollow region, the tool housing also defining at least two apertures extending through the tool housing;

a first movable implement defining a cutting edge, the implement positionable between (i) a first position in which the implement is disposed entirely within the interior hollow region defined by the tool housing, and (ii) a second position in which at least a portion of the cutting edge is exposed within at least one of the apertures;

a second movable implement defining a cutting edge, wherein at least one of the apertures has a substantially semi-circular profile defined by a major axis and a minor axis, a length of the major axis being from about 101% to about 116% of a length of the minor axis.

13. The cutting tool of claim 12 wherein the length of the major axis is from about 103% to about 109% of the length of the minor axis.

14. The cutting tool of claim 12 wherein the first implement is extendable into the at least one aperture and is displaced along a travel axis during retracting and extending, the at least one aperture having a substantially semi-circular shape and oriented such that the major axis of a first axis is generally parallel to the travel axis.

15. A cutting tool comprising:

a body defining a first side and a second side oppositely directed from the first side, the body also defining a first aperture extending through the body between the first side and the second side and a second aperture extending through the body between the first side and the second side, the first aperture being larger than the second aperture;

a first implement selectively positionable between an extended position in which at least a portion of the implement is exposed within the first aperture and a retracted position; and a second implement selectively positionable between an extended position in which at least a portion of the implement is exposed within the second aperture and a retracted position;

wherein the first aperture has a substantially semi-circular profile and defines a major axis and a minor axis, a length of the major axis being from about 101% to about 116% of a length of the minor axis.

16. The cutting tool of claim 15 wherein the second aperture has a substantially semi-circular profile and defines a major axis and a minor axis, the length of the major axis of the second aperture being from about 101% to about 116% of the length of the minor axis of the second aperture.

17. The cutting tool of claim 15 wherein the first implement is selectively positionable along a travel axis, the orientation of the first aperture and the first implement such that the major axis of the first aperture is parallel to the travel axis.

18. The cutting tool of claim 16 wherein the second implement is selectively positionable along a travel axis, the orientation of the second aperture and the second implement such that the major axis of the second aperture is parallel to the travel axis.

19. A cutting tool comprising:

a body defining a hollow interior, a first side and a second side oppositely directed from the first side, the body also defining a first aperture extending through the body between the first side and the second side and a second aperture extending through the body between the first side and the second side, the first aperture being larger than the second aperture;

a first implement selectively positionable between an extended position in which at least a portion of the implement is exposed within the first aperture and a retracted position in which the implement is disposed within the hollow interior; and a second implement selectively positionable between an extended position in which at least a portion of the implement is exposed within the second aperture and a retracted position in which the implement is disposed within the hollow interior;

wherein at least one of the first implement and the second implement are biased to their extended position and the first aperture is defined by a circumferential wall extending through the body and between the first and second sides, the body also defining a blade access region associated with the first aperture and extending between (i) the circumferential wall and the first side and (ii) the circumferential wall and the second side.

20. The cutting tool of claim 16 wherein the second aperture is defined by a second circumferential wall extending through the body and between the first and second sides, the body also defining a second blade access region associated with the second aperture and extending between (i) the second circumferential wall and the first side and (ii) the second circumferential wall and the second side.

* * * * *